(12) United States Patent
Ginsberg

(10) Patent No.: US 7,349,873 B2
(45) Date of Patent: Mar. 25, 2008

(54) METHODS AND SYSTEMS FOR ACCESSING FINANCIAL PROSPECTUS DATA

(75) Inventor: Philip M. Ginsberg, New York, NY (US)

(73) Assignee: CFPH, LLC, New York, NY (US)

( * ) Notice: Subject to any disclaimer, the term of this patent is extended or adjusted under 35 U.S.C. 154(b) by 650 days.

(21) Appl. No.: 09/843,093

(22) Filed: Apr. 26, 2001

(65) Prior Publication Data
US 2002/0161683 A1 Oct. 31, 2002

(51) Int. Cl.
G06Q 40/00 (2006.01)

(52) U.S. Cl. .............................. 705/30; 705/35; 705/36

(58) Field of Classification Search ............ 705/35–45, 705/30
See application file for complete search history.

(56) References Cited

U.S. PATENT DOCUMENTS

| 4,102,493 | A | 7/1978 | Moreno | |
| 5,270,922 | A | 12/1993 | Higgins | 364/408 |
| 5,428,606 | A | 6/1995 | Moskowitz | 370/60 |
| 5,748,931 | A | 5/1998 | Jones et al. | 395/356 |
| 6,122,635 | A | 9/2000 | Burakoff et al. | 707/102 |
| 6,448,979 | B1 | 9/2002 | Schena et al. | 345/741 |
| 6,750,777 | B2 * | 6/2004 | Larson et al. | 340/691.1 |

FOREIGN PATENT DOCUMENTS

| DE | 40 42 297 A1 | 7/1991 |
| DE | 196 46 636 | 5/1998 |
| DE | 100 34 082 A1 | 1/2002 |
| EP | 0 042 599 A2 | 12/1981 |
| EP | 0 354 260 A1 | 2/1990 |
| EP | 0 855 675 A3 | 7/1998 |
| JP | 8-142538 | 6/1996 |
| JP | 08-142538 A | 6/1996 |
| JP | 10-203051 | 8/1998 |
| JP | 11-348470 | 12/1999 |

OTHER PUBLICATIONS

Boros, Multimedia White Paper, Dec. 1999.*

* cited by examiner

Primary Examiner—R. Weisberger
(74) Attorney, Agent, or Firm—Antonio Papageorgiou

(57) ABSTRACT

Methods and systems for accessing prospectus data are provided. These methods and systems utilize electronically readable media incorporated into a printed financial prospectus to provide access to data in an electronic format. A suitable device may then be used to read data from the electronically readable media and store the data on a computer system. The information provided by the prospectus therefore contains both human-readable and electronically readable information. The data may be provided in a summary form, in a standardized form, or in any other suitable form in order to facilitate subsequent analysis of the data. The data may also be encrypted while stored in the electronically readable media.

16 Claims, 3 Drawing Sheets

| | PERIOD FROM INCEPTION THROUGH ~~ | | YEAR ENDED DECEMBER 31, | | | SIX MONTHS ENDED JUNE 30, | |
|---|---|---|---|---|---|---|---|
| | ~~ | ~~ | ~~ | ~~ | ~~ | ~~ | ~~ |
| STATEMENT OF OPERATION DATE: | | | | | | | |
| NET REVENUES | $ — | $ — | $ — | $ — | $ — | $ — | $ — |
| OPERATING EXPENSES: | | | | | | | |
| RESEARCH AND DEVELOPMENT | ~~ | ~~ | ~~ | ~~ | ~~ | ~~ | ~~ |
| SALES AND MARKETING | ~~ | ~~ | ~~ | ~~ | ~~ | ~~ | ~~ |
| GENERAL AND ADMINISTRATIVE | ~~ | ~~ | ~~ | ~~ | ~~ | ~~ | ~~ |
| DEFERRED STOCK COMPENSATION | — | — | ~~ | ~~ | ~~ | ~~ | ~~ |
| OPERATING LOSS | ~~ | ~~ | ~~ | ~~ | ~~ | ~~ | ~~ |
| INTEREST INCOME (EXPENSE), NET | ~~ | ~~ | ~~ | ~~ | ~~ | ~~ | ~~ |
| NET LOSS | ~~ | ~~ | ~~ | ~~ | ~~ | ~~ | ~~ |
| ACCRETION ON REDEEMABLE CONVERTIBLE PREFERRED STOCK | ~~ | ~~ | ~~ | ~~ | ~~ | ~~ | ~~ |
| NET LOSS ATTRIBUTABLE TO COMMON STOCKHOLDERS | ~~ | ~~ | ~~ | ~~ | ~~ | ~~ | ~~ |
| NET LOSS PER COMMON SHARE (BASIC AND DILUTED) | ~~ | ~~ | ~~ | ~~ | ~~ | ~~ | ~~ |
| PRO FORMA NET LOSS PER SHARE BASIC AND DILUTED) | | | | | $ ~~ | | $ ~~ |
| WEIGHTED AVERAGE SHARES OUTSTANDING (BASIC AND DILUTED) | ~~ | ~~ | ~~ | ~~ | ~~ | ~~ | ~~ |
| SHARES USED IN CALCULATION OF PRO FORMA NET LOSS PER SHARE BASIC AND DILUTED(1) | | | | | ~~ | | ~~ |

| | AS OF DECEMBER 31, | | | | | | |
|---|---|---|---|---|---|---|---|
| | ~~ | ~~ | ~~ | ~~ | ~~ | ~~ | ~~ |
| BALANCE SHEET DATA: | | | | | | | |
| CASH AND CASH EQUIVALENTS | ~~ | ~~ | ~~ | ~~ | ~~ | ~~ | ~~ |
| WORKING CAPITAL (DEFICIT) | ~~ | ~~ | ~~ | ~~ | ~~ | ~~ | ~~ |
| TOTAL ASSETS | ~~ | ~~ | ~~ | ~~ | ~~ | ~~ | ~~ |
| LONG-TERM OBLIGATIONS, NET OF CURRENT PORTION | ~~ | ~~ | ~~ | ~~ | ~~ | ~~ | ~~ |
| TOTAL STOCKHOLDERS' EQUITY (DEFICIT) | ~~ | ~~ | ~~ | ~~ | ~~ | ~~ | ~~ |

METHODS AND SYSTEMS FOR ACCESSING FINANCIAL PROSPECTUS DATA

BACKGROUND OF THE INVENTION

This invention relates to automation processes for accessing financial prospectus data. More particularly, this invention relates to methods and systems for enabling users of prospectuses to easily access the financial information contained therein.

A prospectus is a written document providing information concerning an offering of financial securities. A prospectus contains narrative information on, for instance, the type and classification of security, the type of business associated with a security, potential risk factors, use of proceeds, and security voting rights. A prospectus may also include both consolidated and detailed financial information on the associated business and the security itself. Information in the form of data in the prospectus may, for instance, include underwriter compensation, dilution data, operations data, summary of accounting policies, inventories, property and equipment, leases and other assets, short-term borrowing and long-term debt, employee benefit plans, management salaries, income taxes and authorization of common and preferred stock. The amount of data contained in a prospectus may be extensive.

Prospectuses are available in printed form, typically as a booklet, suitable for distribution to potential purchasers of securities. If the prospectus is associated with a federally-regulated security, it has to be submitted to the Securities Exchange Commission (SEC) where it is entered into their Electronic Data Gathering, Analysis, and Retrieval System (EDGAR). The prospectus information is then accessible by the general public over the SEC-maintained database. The files in EDGAR are in either plain text or Hypertext Mark-up Language (HTML) form. Unofficial Portable Document Format (PDF) files may also be submitted to the SEC. All of these file types are in a human-readable form but not in electronically readable form. Further, the information and data contained in financial prospectuses may be in a variety of formats and arrangements which may make the information and data difficult to read, analyze and interpret.

Therefore, the information and data presented in prospectuses may be difficult to manage because of its volume, form, format and arrangement. Thus, it is desirable to provide methods and systems for prospectus data management. Such methods would facilitate the provision of data in a manner that is electronically accessible and more easily usable.

SUMMARY OF THE INVENTION

These and other objects of the invention are accomplished with the principle of the present invention by providing methods and systems for prospectus data management.

In accordance with the invention, these methods and systems provide prospectus data management by the use of electronically readable media incorporated into (e.g., encapsulated on the cover) a printed prospectus where the media stores important financial information and data. The prospectus information is therefore available in both a human-readable and electronically readable format. The electronically readable media may be in the form of, for instance, bar codes, magnetic strips or embedded chips. The data can be read from the prospectus using a suitable device. Multiple electronically readable media types may be provided for storage of different data, i.e. salaries, assets, etc. The prospectus data that is electronically readable may be in a summary form. The data may also be in a standardized form. Additionally, the electronically readable information and data may be in an encrypted form where decryption software is subsequently needed to read data.

BRIEF DESCRIPTION OF THE DRAWINGS

These and other objects and advantages of the invention will become apparent upon reading the following detailed description and upon reference to the drawings in which:

FIG. 2 is a depiction of a table in accordance with one embodiment of the present invention where the data table shown could be of a type found in a securities' prospectus.

DETAILED DESCRIPTION OF THE PREFERRED EMBODIMENTS

Figure 1:
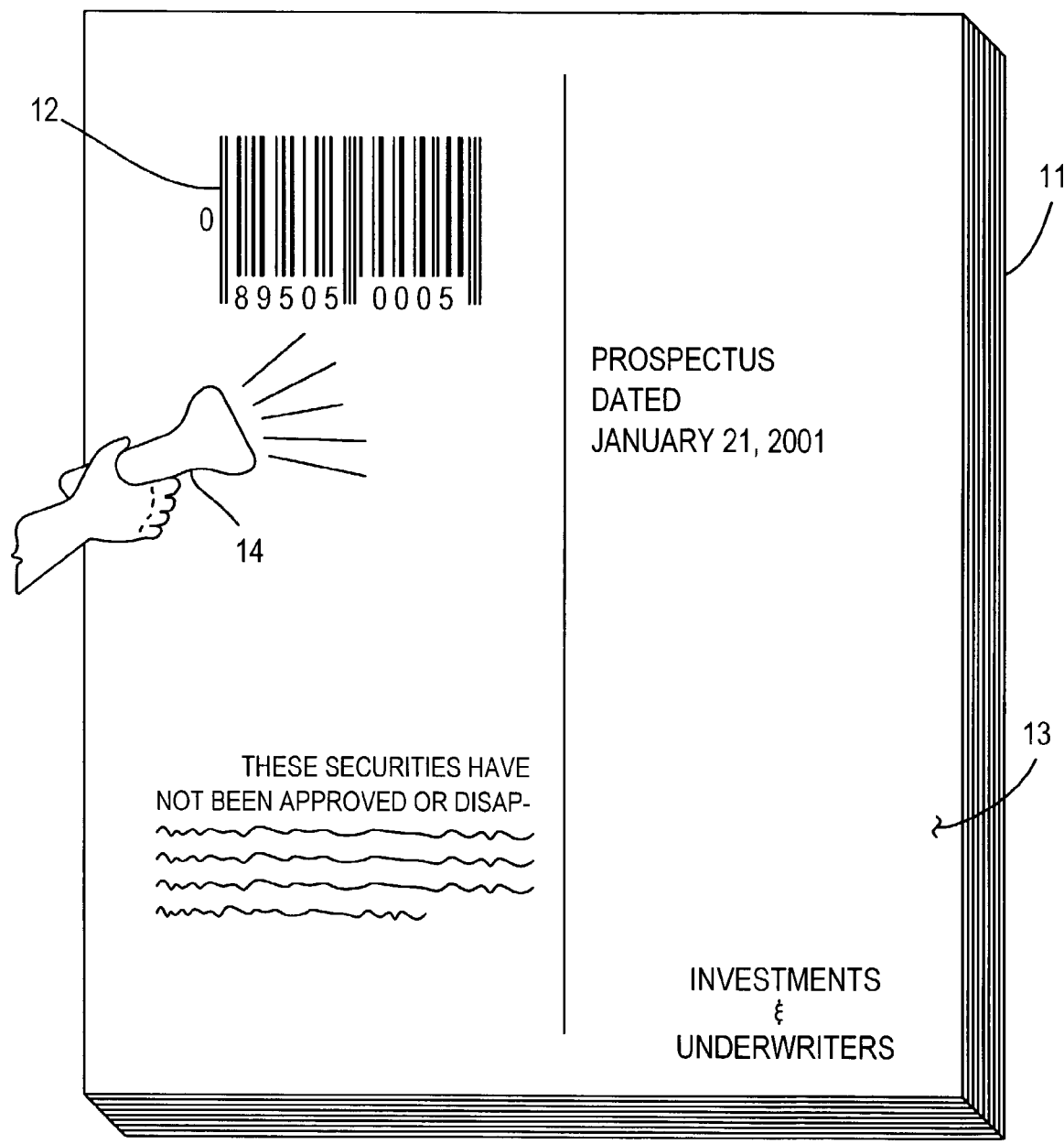
FIG. 1 is a depiction in accordance with one embodiment of the present invention showing the front cover of a printed prospectus with an electronically readable media encapsulated on it.

An illustrative depiction of a system 10 in accordance with certain embodiments of the present invention is shown in FIG. 1. The prospectus may be presented to a user in a conventional, human-readable, printed form 11. Typically, the printed matter is in a booklet form. Electronically readable media 12 may be encapsulated on the cover 13 of the printed prospectus. The electronically readable media may be optical bar codes, magnetic strips, embedded computer chips or any other suitable readable electronic data storage media. There may be multiple electronically readable media 12 types encapsulated on the prospectus cover containing different categories of data such as salary, assets, underwriter information, etc. The information contained in the electronically readable media may be read using a suitable device 14 by a user. For example, device 14 may be a bar code scanner, smart card scanner, or any other suitable device connected to a personal, portable, or hand-held computer, or any other suitable device.

The information contained in the electronically readable media 12 may contain voluminous data tables such as those shown in FIG. 2. Data tables 20 may include information such as the previous performance of securities for the business, borrowing information, information on the security itself, and any other prospectus data as is well known in the art.

Figure 3:
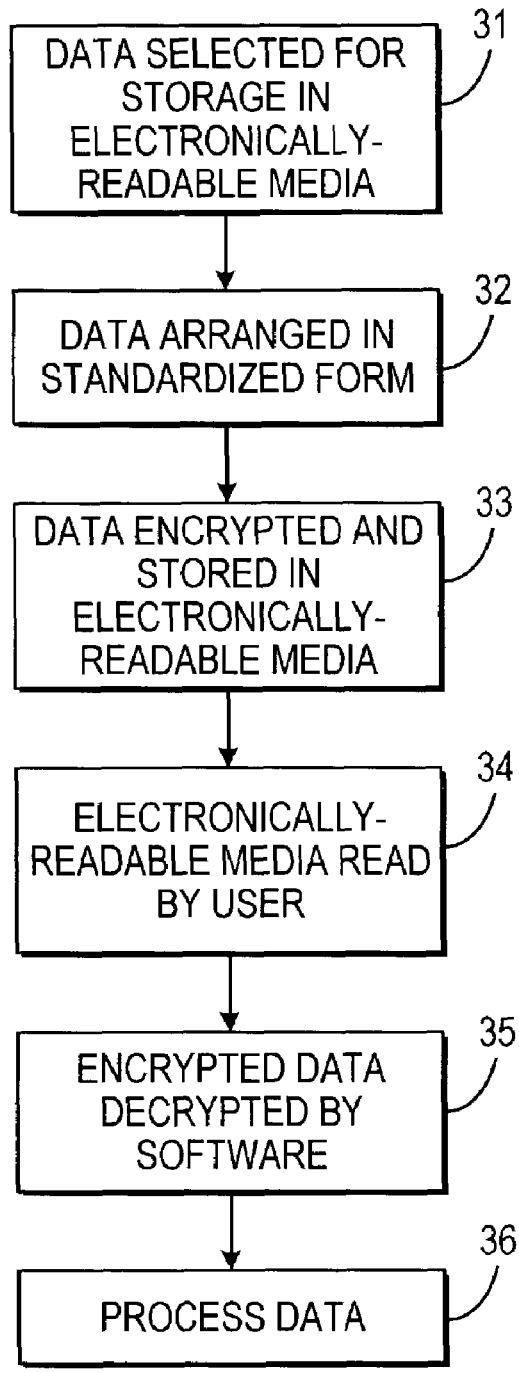
FIG. 3 is a flow chart of the process in accordance with one embodiment of the present invention in which the prospectus electronically readable media is accessed.

One embodiment of a process 30 for using system 10 is shown in FIG. 3. As illustrated, at step 31, specific information and data from the prospectus may be reviewed and chosen for inclusion in the electronically readable media. The data chosen may be included in a summarized form—that is, not all prospectus data but only selected portions may be chosen for inclusion in the electronically readable media.

The data may be stored in a standardized format to facilitate ease of data reading, and subsequent interpretation and analysis. In particular, the use of standardized data forms may allow subsequent mathematical manipulation of financial data in a more efficient manner. For instance, the data may be contained in a standardized format so that, when read, it may be in an appropriate input form to a database where mathematical algorithms may subsequently be applied. The process of arrangement of the data in a standardized form is shown at step 32.

At step 33, the information and data may be converted to an encrypted form in one embodiment using any of a wide variety of mathematical encryption methods as known in the art. The encrypted data may then be stored in the electronically readable media 12.

At step 34, the information and data may be read from the electronically readable media 12 using a suitable device. For instance, a bar code may be read by an optical scanner. The prospectus information and data may be transferred to and stored on a variety of suitable computer systems, including, but not limited to, personal computers. If data had been encrypted, decryption software installed on a personal computer, or other suitable device, may be needed to convert information to a decrypted form as illustrated by step 35. Encryption of the information and data may be used, for instance, to restrict reading of data to users who had purchased the decryption software.

Finally, the data may be processed on the computer to aid the user in evaluating the subject of the prospectus, as shown at step 36. This processing may include generating graphs, spreadsheet tables, or any other suitable data processing technique as known in the art.

Thus, it is apparent that it has been provided, in accordance with the invention, a prospectus data management system that fully satisfies the objects, aims and advantages set forth above. While the invention has been described in conjunction with specific embodiments thereof, it is evident that many alternatives, modifications and variations as fall within the spirit of the appended claims exist.

What is claimed is:

1. A method for accessing prospectus data, comprising:
   identifying a first portion of financial prospectus data having a size when converted to an optical readable format no greater than the storage capacity of an optical bar code, wherein a printed financial prospectus comprises the first portion of financial prospectus data in a human-readable format;
   encoding the first portion of prospectus data on a first optical bar code;
   affixing the first optical bar code to the printed financial prospectus; and
   extracting and converting the optical readable data back to a human readable format without removing the affixed first optical bar code from the printed financial prospectus.

2. The method of claim 1, further comprising:
   identifying a second portion of financial prospectus data having a size when converted to an optical readable format no greater than the storage capacity of an optical bar code, wherein the printed financial prospectus comprises the second portion of financial prospectus data in a human-readable format;
   encoding the second portion of prospectus data on a second optical bar code; and
   affixing the second optical bar code to the printed financial prospectus.

3. The method of claim 1 wherein the first optical bar code stores the first portion of prospectus data in a summary format.

4. The method of claim 1, wherein the first optical bar code stores the first portion of prospectus data in a standardized format.

5. The method of claim 2, wherein:
   the first optical bar code stores a first category of information associated with the printed financial prospectus; and
   the second optical bar code stores a second category of information associated with the printed financial prospectus, wherein the first category of information is different from the second category of information.

6. The method of claim 1, wherein the first optical bar code is affixed to a cover of the printed financial prospectus.

7. The method of claim 1, wherein:
   the printed financial prospectus comprises two or more of the following plurality of data types: security information, classification information, consolidated financial information, inventory information, dilution data, asset information, debt information, past performance information, management salary information, tax information, underwriter compensation information, and operations data; and
   the first portion of financial prospectus data is at least in part a first one of the plurality of data types;
   and further comprising:
   identifying a second portion of financial prospectus data having a size when converted to an optical readable format no greater than the storage capacity of an optical bar code and that is at least in part a second one of the plurality of data types;
   encoding the second portion of prospectus data as a second optical bar code; and
   affixing the second optical bar code to the printed financial prospectus.

8. The method of 1, wherein the optical readable data is extracted from the first optical bar code using a bar code scanner.

9. The method of claim 8, further comprising writing the data extracted from the first optical bar code to a database.

10. A method for accessing prospectus data, comprising:
    receiving a printed financial prospectus, the prospectus comprising:
    a first portion of financial prospectus data in a human-readable format having a size when converted to an optical readable format no greater than the storage capacity of an optical bar code, and
    a first optical bar code affixed to the printed financial prospectus that encodes the first portion of financial prospectus data; and
    extracting and converting the optical readable data back to a human readable format without removing the affixed first optical bar code from the printed financial prospectus.

11. The method of claim 10, the printed financial prospectus further comprising:
    a second portion of financial prospectus data in a human-readable format having a size when converted to an optical readable format no greater than the storage capacity of an optical bar code, and
    a second optical bar code affixed to the printed financial prospectus data that encodes the second portion of the financial prospectus data.

12. The method of claim 11, wherein:
    the first optical bar code stores a first category of information associated with the printed financial prospectus; and
    the second optical bar code stores a second category of information associated with the printed financial prospectus, wherein the first category of information is different from the second category of information.

13. The method of claim 11, wherein:
the printed financial prospectus comprises two or more of the following plurality of data types: security information, classification information, consolidated financial information, inventory information, dilution data, asset information, debt information, past performance information, management salary information, tax information, underwriter compensation information, and operations data;
the first portion of financial prospectus data is at least in part a first one of the plurality of data types; and
the second portion of financial prospectus data is at least in part a second one of the plurality of data types.

14. The method of claim 10, wherein the first optical bar code stores the first portion of prospectus data in a summary format.

15. The method of claim 10, wherein the first optical bar code stores the first portion of prospectus data in a standardized format.

16. The method of claim 10, wherein the first optical bar code is affixed to a cover of the printed financial prospectus.

* * * * *